Patented May 18, 1937

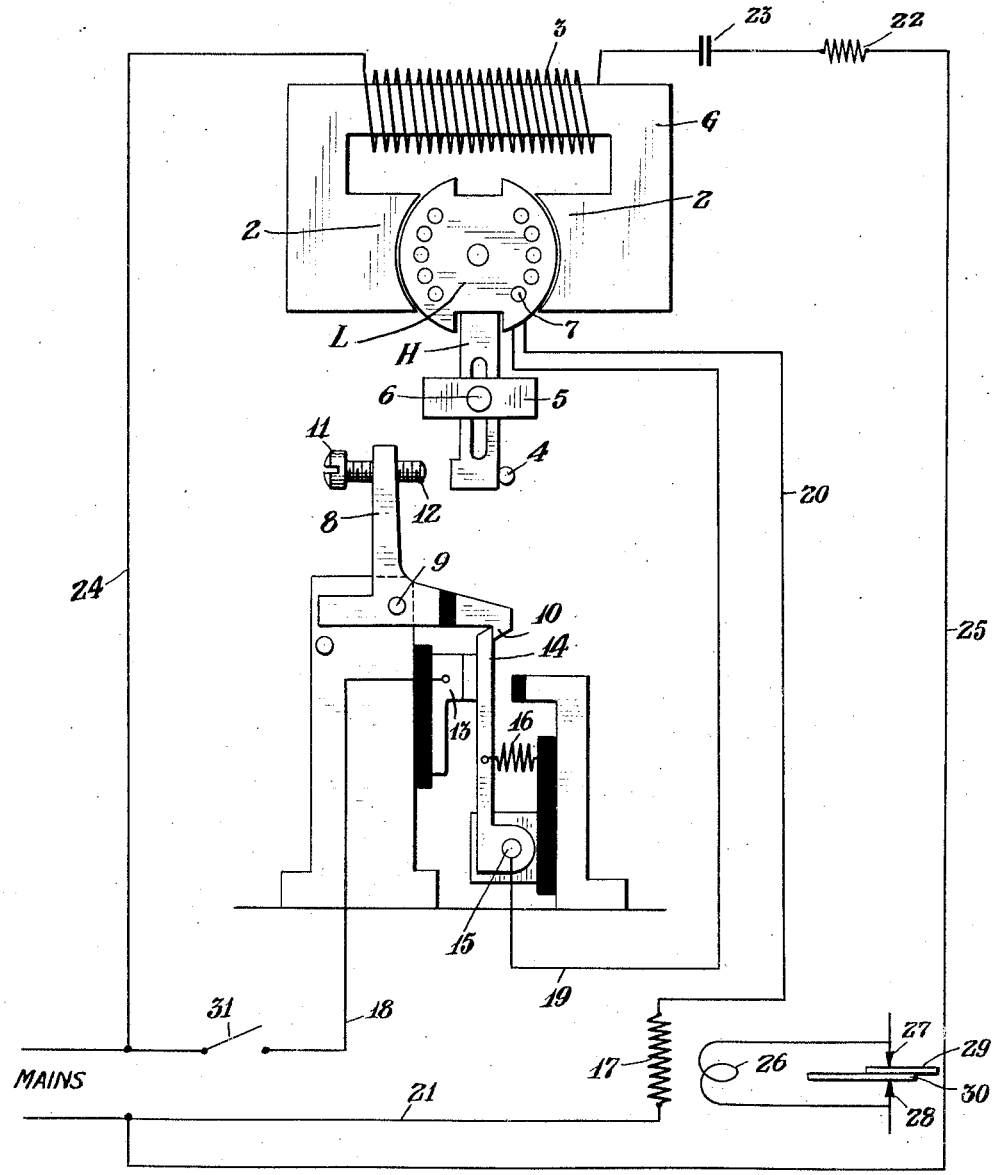

2,081,124

UNITED STATES PATENT OFFICE 2,081,124

ENERGY CONTROL

Carlo Vicario, New York, N. Y., assignor to Fleetwings, Incorporated, Garden City, N. Y., a corporation of Delaware Application October 24, 1932, Serial No. 639,205

8 Claims. (Cl. 200—106)

This invention relates to an energy control and particularly to an energy control suitable for use in association with electric spot welding circuits, and an object of the invention is to provide efficient means whereby the amount of electrical energy delivered through each of a series of apparently similar spot welds will be the same in every instance notwithstanding the varying amounts of resistance encountered in these welds.

In forming a series of spot welds, the actual conditions encountered in each of the spot welds varies to a considerable extent. The thickness of the two pieces of metal of supposedly the same gage being joined may vary slightly, or they may be resting tighter together in one spot weld than in another, or other elements may be present effective to cause the flow of current through the weld to be more or less difficult in one case than in another.

Specifically, therefore, it is the purpose of the present invention to automatically compensate for the varying conditions met with in different welds. The invention provides that if conditions in a given weld are unfavorable to the easy passage of current through the parts being welded then the period of welding heat will automatically be maintained relatively longer than if the conditions are more favorable, so that the amount of energy consumed in each case will be the same.

A further object is to provide means manually adjustable to determine the amount of energy to be delivered to the welding electrodes at the will of the operator.

A further detailed object is to provide an electrically operable inertia device connected in series in the welding circuit, and including a circuit breaker for said circuit controlled by the inertia device, whereby the circuit breaker will be operated by the inertia device to break the welding circuit after a period dependent upon the amount of current flowing through the inertia device.

A further specific object is to so construct the inertia device that it will deliver a hammer blow for operating the circuit breaker.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention, and in which there is shown a diagrammatic view illustrating the invention, the reference character L indicates a small iron oscillator mounted between opposite poles 2—2 of a stationary electro-magnet G having an appropriate winding 3 thereon to magnetize the poles and cause magnetic flux to pass through the oscillator.

The oscillator has fixed thereto a pendulum H which hangs normally vertically down from the pivotal axis of the oscillator and preferably rests against a stop 4 which prevents it from swinging in one direction beyond its normal vertical position.

Vertically slidable upon the pendulum is a weight 5 manually adjustable by means of a set screw or other fastening device as 6 by which it may be held in any adjusted position longitudinally of the pendulum.

The oscillator is suitably wound, as indicated at 7, in such a way that when current is flowing therethrough a torque is produced about the axis of the oscillator effective to cause the pendulum to swing away from the stop 4.

At the side of the pendulum opposite from the stop 4 is arranged a lever 8 pivotally mounted as at 9 and formed with a hook as 10 at its opposite end. At the end of the arm 8 is an adjustable set screw 11 having its end as 12 disposed as an abutment to be engaged by the lower end of the pendulum when the pendulum is swung away from stop 4.

The arc through which the pendulum must swing before striking the abutment 12 may be accurately determined by adjustment of screw 11 through the arm 8 toward or away from the pendulum.

Adjacent to the hook end of the arm 8 is a stationary contact 13, and co-operative therewith is a movable contact 14 pivotally mounted as at 15 and adapted to be held against the contact 13 by means of the hook 10.

A tension spring 16 is connected with the movable contact 14 urging it always in a direction out of engagement with contact 13.

The contacts 13 and 14, and likewise the winding of the oscillator, are in series in the circuit of the primary winding 17 of the welding transformer, this circuit, as illustrated, being along a wire 18 from one side of the mains to the contact 13, thence from contact 14 along a wire 19 to one terminal of the oscillator, from the opposite terminal of the oscillator along a wire 20 to one terminal of the winding 17, and thence along a wire 21 to the opposite main.

The circuit for the winding 3 of the electromagnet G may preferably include in series therewith suitable resistance as 22 and a condenser as 23, said circuit being connected across the mains, and, as illustrated, being from one of the mains, along a wire as 24 to one terminal of the winding 3, from the opposite terminal of winding 3 in series through the condenser and the resistance and along a wire 25 to the opposite main.

The condenser 23 serves to properly tune the circuit so that the flux will be in correct phase with the current in the oscillator winding so as to operate the oscillator as mentioned.

The resistance 22 may be adjustable if desired.

The secondary of the welding transformer is indicated by the reference character 26 and the opposite welding jaws are indicated by the reference characters 27 and 28.

The reference characters 29 and 30 indicate two pieces of work which are being joined by a spot weld between the jaws 27 and 28.

A hand operable switch as 31 may preferably be arranged for making and breaking the circuit of the transformer primary, as indicated.

In operation: Supposing the contact 14 to be held against contact 13 by hook 10, as illustrated, and two pieces of work as 29 and 30 to be positioned between the welding jaws, by closing the switch 31 the welding circuit will be closed and the welding operation will begin. The flow of current through the winding of the oscillator will cause the oscillator to swing upon its axis and to thereby swing the pendulum away from stop 4. When the pendulum has swung sufficiently far it will strike a hammer blow against abutment 12 and will cause the lever 8 to move about its pivot and disconnect the hook 10 from the contact 14, thereby releasing said contact so that spring 16 will be effective to break the welding circuit between the contacts 13 and 14.

As soon as the welding circuit is broken the pendulum will of course fall back again to its original or normal position against stop 4 ready for a subsequent operation.

It will be apparent that the amount of current passing at the weld will determine the rapidity of movement of the pendulum and that the time taken to move the pendulum will in turn determine the total of energy delivered to the weld. These two elements balance against each other and are accurately controlled by the condition of the work being welded so that the amount of energy is always the same for each weld while the time consumed in its delivery may vary within considerable limits for different welds.

In the structure illustrated, the period during which the welding current will flow depends upon the period of time between the moment the pendulum begins to move and the moment it strikes and operates the lever 8. If the condition of the parts being welded between the jaws 27 and 28 is favorable the current passing through the winding of the oscillator will be relatively strong so that the pendulum will be caused to swing at a relatively high speed, but if the condition of the parts being welded is less favorable then the current through the winding of the oscillator will be relatively weak and the consequent movement of the pendulum will be more sluggish and a relatively greater amount of time will be consumed in releasing the contact 14. The amount of energy consumed at the weld in both cases however will be precisely the same.

By manually adjusting the weight 5 to stand higher or lower lengthwise of the pendulum the inertia of the pendulum is reduced or increased as will be readily understood. The amount of energy delivered to the weld may thus be altered at will.

By manually adjusting the screw 11 to increase or diminish the arc through which the pendulum must swing before releasing the contact 14 the normal period of welding heat may be altered within desirable limits, and this will also vary the amount of energy passing in a given weld.

The manually adjustable devices 5 and 11 thus provide means by which the amount of energy delivered to the electrodes 27—28 may be accurately determined by the operator to meet the requirements of different classes of welds. In one adjustment of these parts the apparatus will deliver a relatively small amount of energy suitable for a class of relatively light welds, while in another adjustment the apparatus will deliver relatively more energy suitable for a class of relatively larger welds.

Before repeating the welding operation it is of course necessary to open the switch 31 and then close the circuit at contacts 13 and 14.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. In a switch device, a contact member movable for controlling an electric circuit, and an electrically operable inertia device including an electro-magnet having a rotatable electro-magnet between its poles, means to vary the inertia of the device to vary the circuit energy to which the device responds, a latch to hold the contact member against movement in one direction, and means whereby a rotary movement of the electro-magnet between said poles will trip the latch comprising impact means carried by the inertia device.

2. A switch for controlling a welding circuit, said switch comprising a rotatably mounted electro-magnet adapted for connection in the circuit, a movable contact having a bias to "off" position, a latch to hold the contact in "on" position, means to trip the latch by rotary movement of the magnet, means to vary the circuit energy to which the electro-magnet responds, and means to vary the timing of the trip of the latch in response to the circuit energy.

3. In a switch device, a contact member movable for controlling an electric circuit, and an electrically operable inertia device including movable means having a pendulum fixed thereto to oscillate therewith serving as a hammer to impart a hammer blow effective to produce movement of the contact member, means to vary the inertia of the pendulum, and means to vary the distance through which the inertia device can swing before movement of the contact member is effectively initiated.

4. In a switch device, a contact member movable for controlling an electric circuit, comprising a journalled oscillatable member having an axis, electric means for producing torque on the member to urge it to movement about said axis, a hammer part mounted on the member and hanging by gravity in a predetermined position lower than the axis of the member and which hammer part is arranged to swing arcuately about said axis from a position of rest against the force of gravity to impart a hammer blow effective to produce movement of the contact member, together with means adjustable to alter the arcuate distance through which the hammer part must swing to effect movement of the contact member.

5. In a switch device, a contact member movable for controlling an electric circuit, and an electrically operable inertia device including movable means having a pendulum fixed thereto to oscillate therewith serving as a hammer to impart a hammer blow effective to produce movement of the contact member, together with means adjustable to alter the effect of inertia upon said pendulum.

6. In a switch device, a contact member movable for controlling an electric circuit, and an electrically operable inertia device including movable means having a pendulum fixed thereto to oscillate therewith serving as a hammer to impart a hammer blow effective to produce movement of the contact member, together with means adjustable to alter the effect of inertia upon said pendulum and other means adjustable to alter the arcuate distance through which the pendulum must swing to effect movement of the contact member.

7. Means to control the amount of energy delivered by an electric circuit, said means comprising a stator and movable means each having a separate winding adapted for connection in the circuit, said stator having opposite poles spaced apart and said movable means being oscillatably mounted between said poles and having a pendulum fixed thereto to oscillate therewith, a weight carried by the pendulum adjustable longitudinally thereof, and circuit breaking means operable by movement of the pendulum.

8. A switch for controlling a welding circuit, said switch comprising a rotatably mounted electro-magnet adapted for connection in the circuit, a movable contact, means whereby rotary movement of the magnet will produce an "off" movement of the contact, and means manually adjustable to alter the time period of movement of the magnet before the contact is moved "off".

CARLO VICARIO.